United States Patent [19]

O'Connell et al.

[11] Patent Number: 5,397,101
[45] Date of Patent: Mar. 14, 1995

[54] BALL VALVE

[75] Inventors: Barry G. O'Connell, Geneva; James M. Lorenz, Madison; Leonard H. Brown, Highland Heights, all of Ohio

[73] Assignee: Perfection Corporation, Madison, Ohio

[21] Appl. No.: 246,510

[22] Filed: May 20, 1994

[51] Int. Cl.[6] .................................................. A16K 5/06
[52] U.S. Cl. .............................. 251/315.15; 251/315.01
[58] Field of Search ........................ 251/315 R, 315 NT

[56] References Cited

U.S. PATENT DOCUMENTS

| | | |
|---|---|---|
| 3,462,118 | 8/1969 | Scaramucci ............... 251/315 R X |
| 4,047,275 | 9/1977 | Bake et al. . |
| 4,523,740 | 6/1985 | Paitchell . |
| 4,540,157 | 9/1985 | Kawanami . |
| 4,697,787 | 10/1987 | Pelleboer ................. 251/315 NT |
| 4,744,390 | 5/1988 | Henry . |
| 4,794,944 | 1/1989 | Henry . |
| 5,067,691 | 11/1991 | Hunziker et al. . |
| 5,076,542 | 12/1991 | Ottens et al. ............... 251/315 NT |

Primary Examiner—John C. Fox
Attorney, Agent, or Firm—Fay, Sharpe, Beall, Fagan, Minnich & McKee

[57] ABSTRACT

A ball valve construction particularly suited for forming large diameter ball valves includes a main valve body formed from extruded plastic pipe and having a central through passage with a valve ball mounted centrally therein. An operating stem extends from the ball outwardly of the main body. First and second separate seat retainer rings are positioned on opposite sides of the valve ball. Each retainer ring has an outer surface carrying a seal for engaging the wall of the through passage for preventing fluid flow between the retainer rings and the wall of the through passage. Each retainer ring further defines a spherical seat surface positioned and sized to sealingly engage the valve ball. Adjustable tie rod members join between the retainer rings to cause the seat surfaces to engage the valve ball with a predetermined sealing force.

20 Claims, 4 Drawing Sheets

BALL VALVE

BACKGROUND OF THE INVENTION

The subject invention is directed toward the valve art and, more particularly, to an improved ball valve structure.

The invention is especially useful for forming large diameter ball valves for use in gas distribution systems and will be described with reference thereto; however, the invention is capable of broader application and could be used for valves of a variety of sizes in many environments and for different fluids.

Plastic pipe and compatible plastic valves have come into widespread use in gas distribution systems. These systems often require large diameter valves that are infrequently operated but which must be highly reliable. Several different plastic ball and plug type valve designs have been in use or proposed for use in such systems. These designs are shown, for example, in the following U.S. Pat. Nos. 4,047,275; 4,523,740; 4,540,157; 4,744,390; 4,794,944; 5,067,691; and, 5,076,542.

The various designs shown in these patents rely on relatively complicated, multi-component body designs or troublesome assembly procedures to achieve proper sealing engagement between the ball or plug and the associated seat rings. In addition, the designs frequently require that the body and valve element components be molded to very close tolerances. This necessitates the use of comparatively expensive dies or molds. Alternatively, it has sometimes been necessary to use separate locating elements to assure proper relative positioning of the body components.

SUMMARY OF THE INVENTION

The subject invention provides a ball valve design that overcomes the above-discussed problems and allows proper preload between the seats or seals and ball to be achieved without relying on the relative positioning of the valve body components. In addition, the invention allows bodies for relatively large diameter ball valves to be produced from extruded plastic pipe as opposed to molded components.

In accordance with the subject invention, a ball valve construction is provided that is particularly suited for forming large diameter ball valves. Generally, the valves comprise a cylindrical main valve body having a through passage extending axially between first and second ends. Mounted centrally in the through passage is a ball member having a central through opening. An operating stem extends from the ball outwardly of the main body in a direction perpendicular to the axis of the cylindrical through passage. The ball is arranged so that it can be rotated between a first open position wherein the through opening of the ball is aligned with the through passage of the body and a closed second position wherein the through opening of the body is oriented transverse to the through passage of the body. Associated with the ball are separate first and second retainer ring assemblies positioned respectively in the first and second ends of the through passage on opposite sides of the valve ball. Each retainer ring assembly includes a radial outer surface carrying a seal for engaging the wall of the through passage for preventing fluid flow between the retainer ring assemblies and the wall of the through passage. Each retainer ring assembly further defines a spherical seat surface positioned and sized to sealing engage the valve ball about the through opening when the valve ball is in the first position. Adjustable tension means are provided to extend between the separate first and second retainer ring assemblies for causing the seat surfaces to engage the valve ball with a predetermined sealing force. The adjustable tension means extend through the space between the valve ball and the wall of the through passage.

Preferably, the adjustable tension means include a plurality of tie rod members connected between the retainer ring assemblies and extending parallel to the axis of the through passage.

In a preferred form of the invention, the tie rod members terminate in end portions which extend through the retainer ring assemblies and are sealed relative thereto by seal members mounted within the seal ring assemblies.

During assembly of the ball valve structure of the invention, the seal ring assemblies are placed in contact with the ball and the tie rods placed in position and adjusted to bring the seal ring assemblies into a predetermined sealing force relative to the valve ball. This sealing force is accomplished without reliance on any of the valve body components or the manner in which they are assembled.

In accordance with a further aspect of the invention, the cylindrical main valve body can be formed by machining from an extruded section of plastic pipe with suitable shoulders machined to receive the retainer ring assemblies adjacent the ends of the main body section as defined by the pipe.

If desired, suitable end sections can be applied to the body independent of the installation and adjustment of the ball and the retainer ring assemblies. These end sections can also be machined from standard extruded plastic pipe and joined to the ends of the main body section either mechanically, by sonic welding, or, preferably, through a heat welding operation.

Preferably, and in accordance with a more limited aspect of the invention, the ball and the retainer ring assemblies, with the tie rods in place, can have limited axial movement within the main body section. This eliminates the need for holding extremely close tolerances for the various components that make up the valve. Additionally, each retaining ring assembly preferably includes separate cooperating components which define the spherical seat surface and carry a resilient seat defining member clamped therebetween. In its preferred form, the seat ring assembly is formed from a suitable plastic and the ball is molded from a plastic or suitable resinous material.

As can be seen from the foregoing, a primary object of the present invention is the provision of a ball valve assembly wherein the ball and seat forming components are assembled independently of the housing.

Yet another object is the provision of a ball valve assembly of the type described wherein the components forming the valve body are adapted to be assembled without affecting the relationship between the ball and the seat defining components.

Yet another object is the provision of a ball valve of the type described which is particularly suitable for making large diameter ball valves and which can utilize standard extruded pipe for the body components of the valve.

A further object of the invention is the provision of a valve assembly of the type described wherein the seat defining retainer ring assemblies are independently adjustable relative to the valve body components and do not rely on the body components for generating sealing pressures relative to the ball element.

A still further object of the invention is the provision of a ball valve assembly of the general type described wherein the assembly problems are minimized and the seats can be adjusted entirely independent of the various body defining components.

BRIEF DESCRIPTION OF THE DRAWINGS

The above and other objects and advantages will become apparent from the following description when read in conjunction with the accompanying drawings wherein.

DETAILED DESCRIPTION OF THE PREFERRED EMBODIMENT

Figure 1:
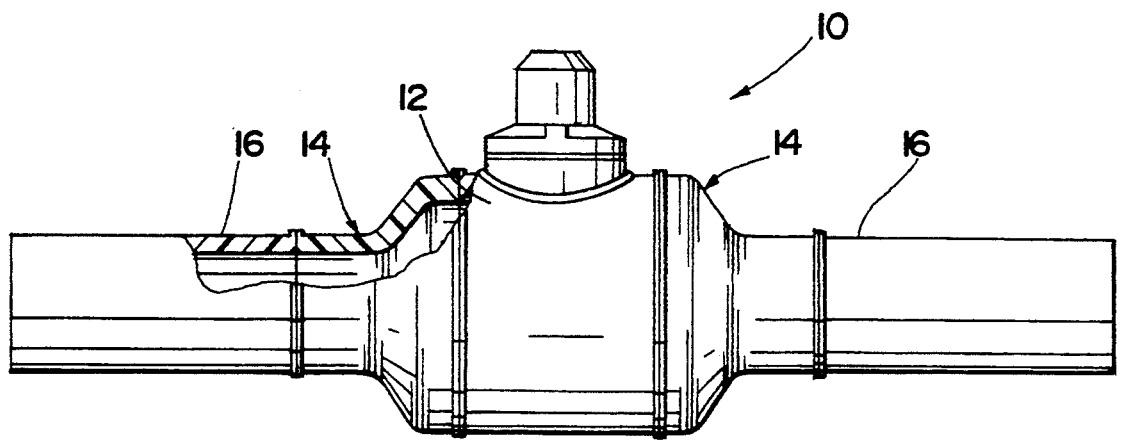
FIG. 1 is a side elevational view of a ball valve formed in accordance with the preferred embodiment of the subject invention.
Figure 2:
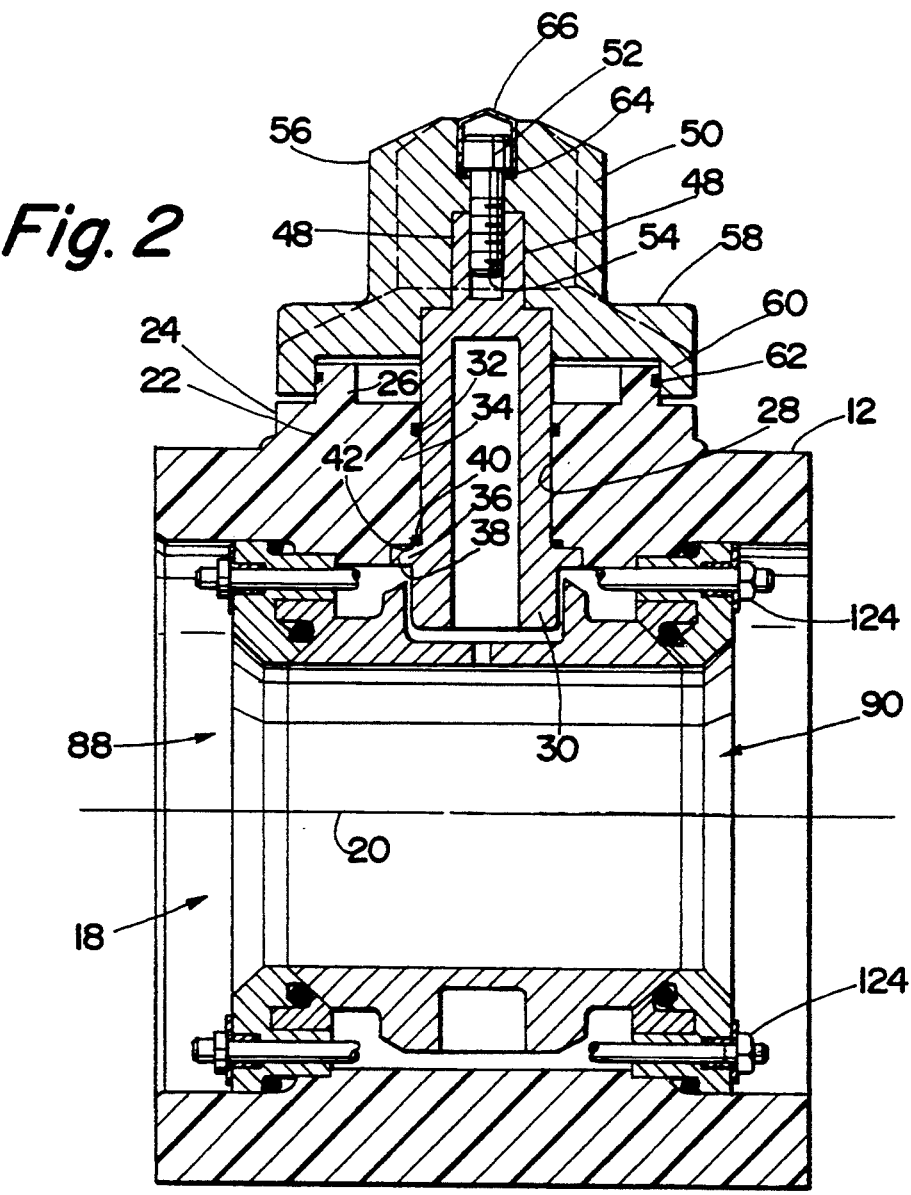
FIG. 2 is a vertical cross-sectional view through the central body portion of the valve shown in FIG. 1 (the valve is shown in its open position)
Figure 3:
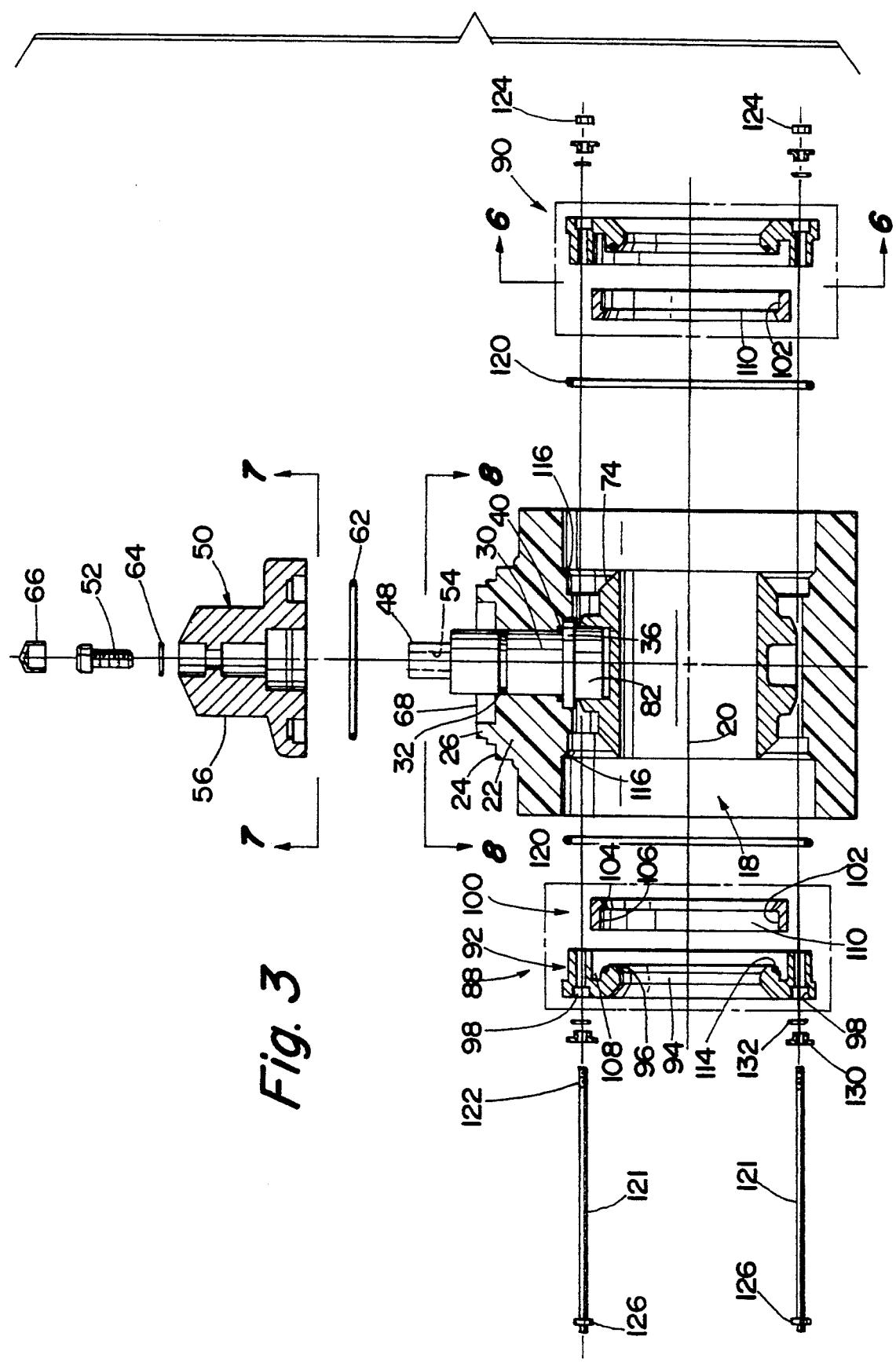
FIG. 3 is an exploded cross-sectional view of the valve shown in FIG. 2.

Referring more particularly to the drawings wherein the showings are for the purpose of illustrating a preferred embodiment of the invention only and not for the purpose of limiting same, FIGS. 1 through 3 best illustrate the overall arrangement and construction of a ball valve assembly 10 formed in accordance with the invention and comprising a main central body section 12 and duplicate inlet and outlet sections 14 which are suitably joined thereto. In the embodiment under consideration, suitable tubular end fitting portions 16 are joined to the body sections 14 and extend therefrom to provide means for mounting the valve to associated piping systems and the like. It should, of course, be understood that various types of end fittings including flanges and mechanical couplings and the like could equally well be used since the particular type of connectors or end fittings used with the valve form no part of the subject invention.

In the subject embodiment, the main central body section 12 is preferably formed from a length of extruded thermoplastic pipe by being machined to the desired length and shape and joined to inlet and outlet sections 14 through standard fusion welding techniques to provide a unitary, integral valve body. It should, of course, be understood that these body sections could be joined mechanically or by sonic welding since the actual relationship between central body section 12 and the end body sections 14 are not critical to the subject invention. With respect to main central body section 12, it is understood that this section could be formed by injection molding techniques. The extruded pipe technique of forming the body is, however, preferred since there are no "knit lines" as would be found if the body were injection molded. The absence of "knit lines" and the use of a homogeneous, extruded body greatly enhances the service life of the valve as there are no weak areas (knit lines) which sometimes cause premature failure of injection molded pressure containing components.

Insofar as the inlet and outlet ends sections 14 are concerned, these can be machined from extruded plastic pipe or injection molded as desired.

Referring in particular to FIGS. 2 and 3, it will be seen that the central body section 12 is of generally cylindrical shape and includes an axially extending cylindrical central through passage 18. The central axis of the body section 12 is indicated with the dot/dash line 20. Extending upwardly from the transverse center of the body section 12 is a cylindrical, stepped diameter bonnet forming portion 22 which is injection molded to the desired shape and heat fused to the body section 12 so that it becomes an integral portion thereof. It should be appreciated that the bonnet could also be machined from an extruded section of plastic pipe. As illustrated, the section 22 has a first shoulder portion 24 and a central upwardly extending collar-like cylindrical portion 26 which are located concentric to a central valve stem receiving opening 28 that is located on the transverse mid-plane of body section 12 and is perpendicular to the center axis 20.

An operating stem member 30 is positioned within the opening 28 and mounted for free rotation therein. As illustrated, the stem 30 is preferably formed of a suitable plastic material and has a cylindrical outer surface that is closely received within the opening 28 for free rotation therein. An O-ring stem seal member 32 is carried within a radially outward facing groove 34 formed in the stem as shown. The stem further includes a radially extending lower shoulder 36 which is sized and closely received in a counterbore 38 formed about the lower end of opening 28. An O-ring seal 40 is positioned between the top surface of flange 36 in a recess 42 formed about the lower end of opening 28. It should be understood that stem 30 and its associated seal rings are installed through central passage 18 prior to installation of the internal valve components of attachment of the end sections.

Figure 8:
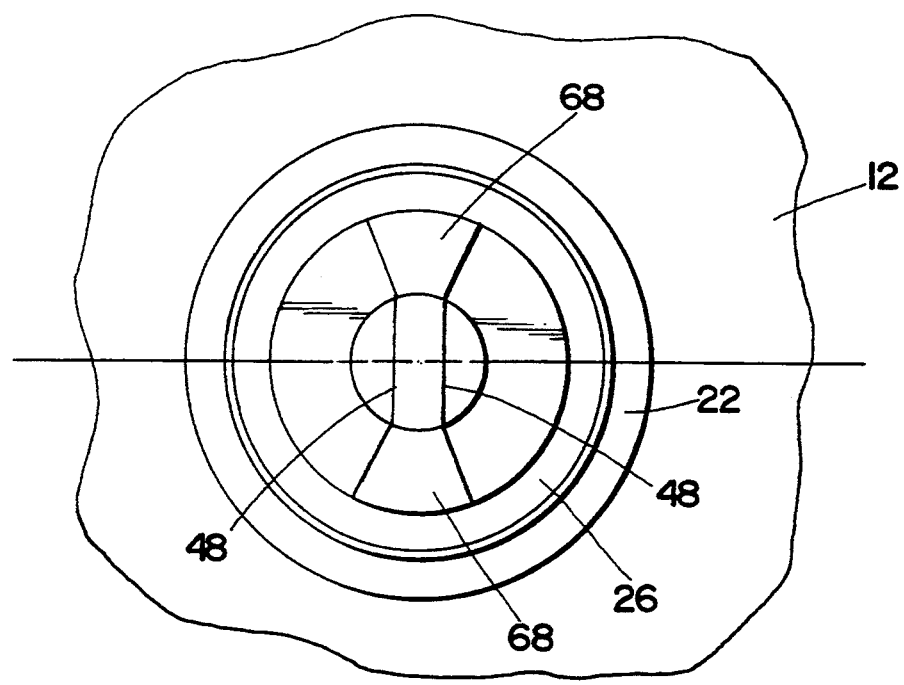

The upper end of the stem 28 has a pair of flats 48 formed on opposite sides thereof (see FIG. 8). An operator member 50 is formed to be received over the upper end of the stem 30 in the manner shown and is connected thereto by a suitable machine screw 52 extending downwardly into threaded engaged with a bore 54 formed axially into the upper end of stem 30. The operator 50 can be provided with an outwardly extending handle or, as is the case in the subject embodiment, suitable wrench flats 56 formed about its exterior for engagement by an operating wrench of the like.

Figure 7:
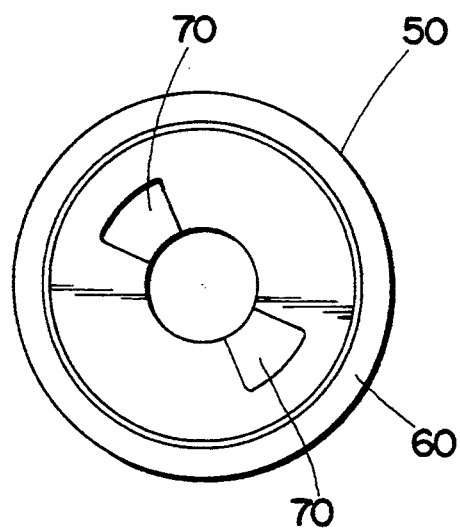

Extending radially outward about the lower end of the operator 50 is a flange portion 58 that has a downwardly extending circumferential collar-like portion 60 carried thereon. The collar 60 is sized and arranged so as to be closely received about the cylindrical outer surface of the bonnet portion 26. Cooperating shoulders or recesses are formed in bonnet portion 26 and collar 60 and an O-ring 62 is carried therein acts to provide a moisture seal between the body and the operator. In addition, it should be noted that a suitable seal in the nature of an O-ring 64 is positioned under the head of machine screw 52 to seal against entry of moisture at this location. A decorative cap member 66 is frictionally received in the upper end of operator 52 enclose the upper end of screw Movement of the operator 50 is limited between fixed stops located to limit the movement of the operator, and consequently the valve, to two positions located 90° apart. Specifically, a first position is such that the valve is "open" and aligned with the axis 20 of the main body 12 and a second position wherein the valve element is in a "closed" or blocking position transverse to the axis and the through opening of the main body. Although the operation and arrangement of the valve element itself will subsequently be discussed in some detail, for the present, it should be noted, as best shown in FIGS. 3, 7, and 8, that the bonnet section 24 is provided with upwardly extending somewhat triangularly shaped stop members shaped and located as shown in FIG. 8. Note that there are two of the stop members 68 located in diagonally opposite position within the flange portion or collar portion 26. Arranged to cooperate with and engage the stop elements 68 are a second pair of stop elements 70 that are carried on the underside of the operator. As shown in FIG. 7, these stop members 70 also have a triangular shape and extend downwardly from the underside of operator 50 within the collar section 60. The two stop members 70 are located in aligned diametrically opposed relationship and engage with the upwardly extending stop members 68 at opposite ends of the predetermined 90° rotation.

Figure 4:
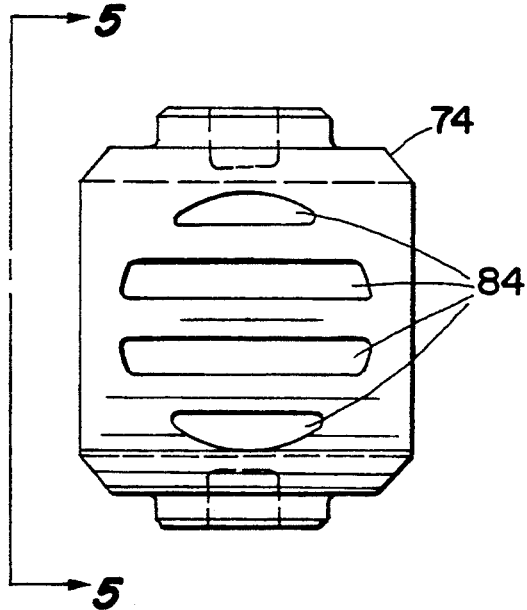
FIG. 4 is a side elevational view of the ball element used in the subject invention.
Figure 5:
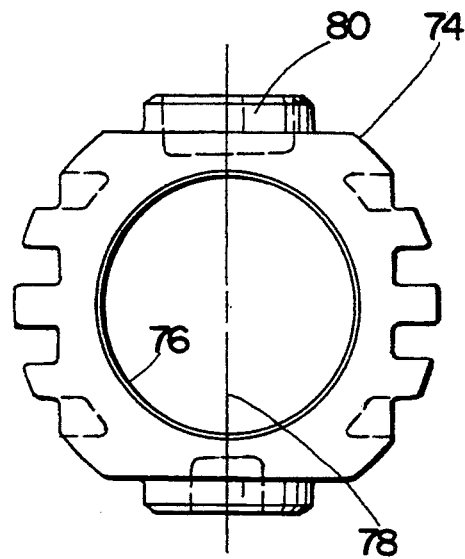
FIG. 5 is a view taken on line 5—5 of FIG. 4.

Of particular importance to the subject invention is the overall arrangement and design of the ball valve element and its associated seat retainer ring assemblies. In particular, as best shown in FIGS. 2 and 3, the flow through the central flow passage 18 is controlled by ball member 74 which is located within the center of the body section 12. The ball member could have many specific designs but is preferably molded from plastic and has the configuration shown in FIGS. 4 and 5. As shown therein, the ball has a central through passage 76 and the exterior of the ball member 74 has a generally spherical configuration with spherical surfaces around the inlet and outlet ends of the passage 76 and joined thereto on the lateral sides of the ball so that it can rotate in engagement with the seat element about the vertical axis 78. At the upper end of the ball, a suitable opening 80 is formed therein. As shown, opening 80 is somewhat rectangular in shape and is non-rotatably engaged with a correspondingly shaped end portion 82 formed on the lower end of stem 30. The exterior surface of the ball is provided with horizontally extending grooves or recesses 84. These recesses or grooves serve to lighten the ball and reduce the quantity of material required for its formation but have no significant effect on the operation of the ball or its function.

As best seen in FIGS. 2 and 3, the ball is retained in its located position in engagement with the stem 30 and in operative relationship to control flow through the passage 18 by a pair of seat retainer ring assemblies 88 and 90. Although the design of the two individual seat retainer ring assemblies 88 and 90 could vary, they are preferably identical and only assembly 88 will be described in detail. The description of assembly 88 is to be taken as equally applicable to assembly 90 unless otherwise noted.

Figure 6:
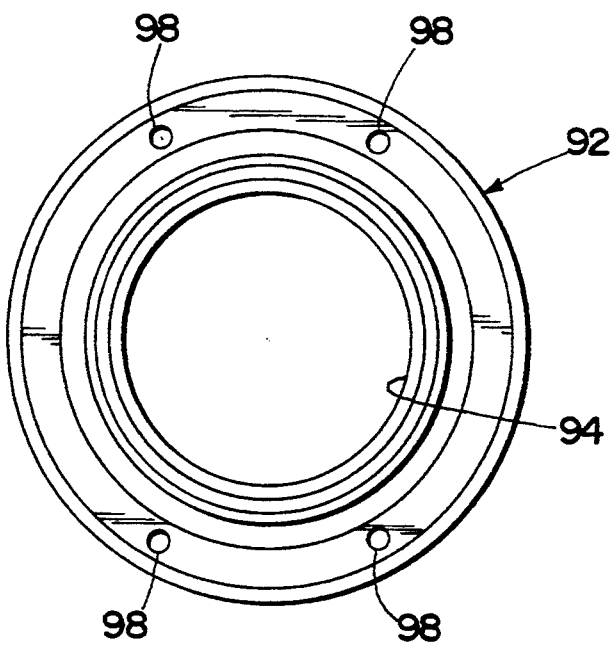
FIG. 6 is a view taken on line 6—6 of FIG. 3 and showing one of the major components of the seat retainer assembly as used in the subject invention; and, FIGS. 7 and 8 are views taken on lines 7—7 and 8—8, respectively, of FIG. 3.

As can best be seen from FIG. 3, the seat retainer ring assembly 88 is a multi-component assembly having a first main ring member 92 that has a central through opening 94 and a seat defining surface 96 having a contour to generally correspond to the exterior spherical contour of the ball member 74. FIG. 6 illustrates the member 92. For reasons which will subsequently become apparent, the ring 92 is provided with four counterbored through openings 98 generally positioned as shown. The ring member 92 has a cross-sectional shape best shown in FIG. 3 and is arranged to cooperate with a second ring member 100 which has a central through opening 102 and an arcuate seat defining surface 104. The member 100 has a rectangular central body section 106 which is arranged to enter into a correspondingly shaped and sized opening 108 formed into ring member 92 circumferentially about the center opening 94. An inwardly extending flange-like section 110 is formed about the central opening 102 and is arranged to overlie and engage a portion of a main seat defining seal ring member 114. When the ring member 100 is assembled into ring member 92, the two rings cooperate to hold the resilient seal ring 114 in clamped position as shown in FIG. 2. The ring 114 has a portion which extends outwardly between the two seat defining surfaces 96 and 104 to engage with the ball circumferentially about the flow passage and prevent fluid flow between the seat ring assembly and the ball.

As previously mentioned, the seat ring assembly 90 is preferably of identical construction although it could, of course, vary somewhat. The two seat retaining ring assemblies 88 and 90 are sized so as to be closely received into the opposite ends of the passage 18. It should be noted that the outer ends of the passage 18 are of slightly larger diameter than the central section and consequently form an inwardly extending circumferentially continuous radial shoulder 116 adjacent but slightly inwardly spaced from each of the opposite ends. When the two seat retaining ring assemblies 88 and 90 are assembled into position in the central valve body section, suitable seal members shown in the form of O-rings 120 are located about the circumferential outer cylindrical surface of the ring member 92 for engagement with outer end portion of the passage 18 and are clamped in position adjacent the flanges or shoulders 116 in a manner subsequently to be described. This arrangement prevents fluid flow through the valve about the outer surfaces of the seat retainer ring assemblies.

The seat retainer ring assemblies 88 and 90 are located in position in the main body section 22 and in sealing and clamping engagement with the ball through the use of interconnecting tension means in the form of tie rod members 121. The tie rod members 120 are preferably formed of stainless steel extend through the previously-mentioned counterbored openings 98 and parallel to the center axis 20 between the exterior of the ball and the inner surface of the passage 18. The tie rods are provided with adjustable tension means in the form of threaded ends 122 and cooperating nuts 124. The opposite ends of the tie rods 121 are provided with a suitable nut or flange member 126. With the tie rods in position as shown in FIG. 3, tightening of the nut members 124 allow adjustment of the clamping and sealing pressure of the complete retaining ring assemblies 88 and 90 into engagement with the ball. Preferably, each of the counterbored openings 98 is provided with a metal insert collar element 130 which acts to retain a seal ring 132 in the counterbored portion of openings 98. This seal ring serves as a seal about the tie rods where they pass through the seat retainer ring assembly to prevent fluid leakage therethrough.

The arrangement thus far described eliminates any problems with the assembly of the valve body and allows the proper sealing pressures and relationships to be achieved between the seat retainer ring assemblies and the ball as well as the housing without affecting the manner in which the end fittings are joined to the main valve body. Note that after the ball and seal ring assemblies are properly located and tightened with the main valve body 12, the end portion 14 of the valve body can be joined to the main body through a heat welding operation if desired. Alternatively, they can be mechanically connected or solvent welded if desired. Likewise, end tubes 16 can also be joined at this time.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A ball valve construction particularly suited for forming large diameter ball valves comprising:
   a cylindrical main valve body having an axially extending cylindrical through passage between first and second ends;
   a valve ball mounted centrally in the cylindrical through passage, the ball member having a central through opening;
   an operating stem extending from the ball outward of the main body perpendicular to the axis of the cylindrical through passage for rotating the ball between a first position wherein the through opening of the ball is aligned with the through passage of the body and a second position wherein the through opening of the ball is oriented transverse to the through passage of the body;
   first and second separate seat retainer ring assemblies positioned respectively in the first and second ends of the through passage on opposite sides of the valve ball, each retainer ring assembly having an outer surface carrying a seal for engaging the wall of the through passage for preventing fluid flow between the retainer ring assemblies and the wall of the through passage, each retainer ring further defining a spherical seat surface positioned and sized to sealingly engage the valve ball about the through opening when the valve ball is in the first position; and,
   adjustable tension means extending between the separate first and second retainer ring assemblies for causing the seat surfaces to engage the valve ball with a predetermined sealing force, the adjustable tension means extending through the space between the valve ball and the wall of the through passage.

2. The ball valve as defined in claim 1 wherein the main valve body is formed from an extruded section of plastic pipe.

3. The ball valve as defined in claim 1 wherein plastic end body sections are heat fused to the main valve body.

4. The ball valve as defined in claim 3 wherein a plastic bonnet member is joined to the main valve body to extend laterally therefrom and provide a support and guide for the operating stem.

5. The ball valve as defined in claim 1 wherein the adjustable tension means comprise a plurality of tie rod members connected between the retainer ring assemblies and extending parallel to the axis of the through passage.

6. The ball valve as defined in claim 5 wherein the tie rod members are located at circumferentially spaced locations about the ball.

7. The ball valve as defined in claim 6 wherein the tie rod members are each separately adjustable to vary the predetermined seal force of the seat surfaces with the ball.

8. The ball valve as defined in claim 1 wherein the adjustable tension means comprise elongated tie rod members terminating in end portions extending through the retainer ring assemblies.

9. The ball valve as defined in claim 8 including sealing ring means located about the end portions of the tie rod members to seal between the tie rods and the retainer ring assemblies.

10. The ball valve as defined in claim 1 wherein the tie rod members have threaded adjustments on at least one end for permitting variation in the force with which the seat surfaces engage the valve ball.

11. The ball valve as defined in claim 1 wherein each retaining ring assembly is formed of two separate components that cooperate to define the spherical seat surface.

12. The ball valve as defined in claim 11 wherein each retaining ring assembly includes a resilient seat ring retained in the spherical seat surface by cooperation of the said two separate components.

13. The ball valve as defined in claim 12 wherein the resilient seat ring comprises an O-ring.

14. The ball valve as defined in claim 11 wherein each retainer ring assembly has a cylindrical outer surface that is closely and slidably received in the through passage.

15. A ball valve construction particularly suited for forming large diameter ball valves comprising:
   a cylindrical main valve body having an axially extending cylindrical through passage between first and second ends;
   a valve ball mounted centrally in the cylindrical through passage, the ball member having a central through opening;
   an operating stem extending from the ball outward of the main body perpendicular to the axis of the cylindrical through passage for rotating the ball between a first position wherein the through opening of the ball is aligned with the through passage of the body and a second position wherein the through opening of the ball is oriented transverse to the through passage of the body;
   first and second separate seat retainer rings positioned respectively in the first and second ends of the through passage on opposite sides of the valve ball, each retainer ring having an outer surface carrying a seal for engaging the wall of the through passage for preventing fluid flow between the retainer rings and the wall of the through passage, each retainer ring further defining a spherical seat surface positioned and sized to sealingly engage the valve ball about the through opening when the valve ball is in the first position; and,
   tie rod members joined between the retainer rings to cause the seat surfaces to engage the valve ball with a predetermined sealing force.

16. The ball valve as defined in claim 15 wherein the tie rod members extend generally parallel to the axis of the through passage between the ball and the wall of the through passage.

17. The ball valve as defined in claim 15 including threaded means on the tie rod members for adjusting the force with which the seat surfaces engage the valve ball.

18. The ball valve as defined in claim 15 wherein the tie rod members have end portions that extend through the retainer assemblies.

19. The ball valve as defined in claim 15 wherein the main valve body is formed from an extruded tubular section of plastic and wherein end body portions are heat fused to the ends of the main valve body after the seat retainer rings are engaged with the ball.

20. The ball valve as defined in claim 15 wherein the main valve body is formed from an extruded tubular section of plastic and a plastic bonnet joined to the body for providing a guide for the stem.

* * * * *